United States Patent [19]

Caldwell

[11] 3,829,687

[45] Aug. 13, 1974

[54] RADIOACTIVE WELL LOGGING TO DISTINGUISH WATER AND HYDROCARBON SATURATION BY DELAYED NEUTRONS FROM OXYGEN

[75] Inventor: Richard L. Caldwell, Dallas, Tex.

[73] Assignee: Mobil Oil Corporation, New York City, N.Y.

[22] Filed: Apr. 25, 1973

[21] Appl. No.: 354,278

[52] U.S. Cl............................... 250/269, 250/262
[51] Int. Cl............................................. G01v 5/00
[58] Field of Search..................... 250/262, 268, 269

[56] References Cited
UNITED STATES PATENTS

| | | | |
|---|---|---|---|
| 3,465,151 | 9/1969 | Youmans | 250/262 |
| 3,638,484 | 2/1972 | Tixier | 250/262 X |
| 3,688,117 | 8/1972 | Givens | 250/269 |

*Primary Examiner*—Archie R. Borchelt
*Attorney, Agent, or Firm*—A. L. Gaboriault; William D. Jackson

[57] ABSTRACT

A well logging process for exploring for petroleum hydrocarbons in which subterranean formations are characterized with regard to their hydrocarbon or water saturation on the basis of their oxygen content. The well under investigation is subjected to a porosity logging procedure such as neutron logging, self potential logging, gamma ray scattering density logging, or acoustic velocity logging in order that one or more formations of relatively high porosity may be identified. Such formations are subjected to a delayed neutron logging procedure in which a formation is irradiated with repetitive bursts of fast neutrons spaced by time intervals greater than the time required for dissipation of neutrons originating in the bursts. Between the bursts and after dissipation of the original source neutrons, a detector is operated in order to detect delayed neutrons resulting from the neutron irradiation of oxygen-17. The radiation count thus obtained provides an indication of the oxygen content of the formation.

8 Claims, 2 Drawing Figures

RADIOACTIVE WELL LOGGING TO DISTINGUISH WATER AND HYDROCARBON SATURATION BY DELAYED NEUTRONS FROM OXYGEN

BACKGROUND OF THE INVENTION

This invention relates to exploration for petroleum hydrocarbons by means of radioactive well logging and more particularly to a radioactive well logging procedure for characterizing subterranean formations with respect to oxygen content in order to differentiate between hydrocarbon saturated and water saturated formations.

In the petroleum industry, various well logging procedures are employed in order to characterize formations penetrated by a well with respect to their lithologic properties and the nature of their fluid content. For example, it is a conventional practice to log a well in order to identify, directly or indirectly, the formations which exhibit porosities characteristic of oil or gas bearing reservoirs. Such porosity logging techniques include neutron logging (in which neutrons or capture gamma rays are detected), density logging (in which scattered gamma rays are detected), self potential logging, and acoustic velocity logging. Formations thus identified may be made the subject of further investigations in order to determine whether they are saturated with hydrocarbons or saturated with water.

U.S. Pat. No. 2,948,810 to Caldwell et al. discloses a radioactive well logging technique for determining variations in oxygen concentrations of subterranean formations in order to distinguish between formations saturated with hydrocarbons and formations saturated with water. The Caldwell et al. process is based upon the fact that most rock matrices contain oxygen in a substantially constant amount. Water also has a high oxygen content whereas oil and gas hydrocarbons contain very little or no oxygen. Thus a rock formation completely or partially saturated with hydrocarbons will exhibit a lower gross oxygen content than a formation of like porosity which is saturated only with water.

In the Caldwell et al. process, the oxygen content of formations under investigation is determined by irradiating the formations with fast neutrons from a high energy deuterium-tritium source and then measuring the activation gamma rays produced by the reaction:

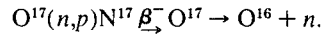

$$O^{16}(n,p)N^{16} \xrightarrow{\beta^-} O^{16} + \gamma. \tag{1}$$

The gamma radiation resulting from this reaction has prominent energy levels of 6.13 Mev, 6.90 Mev, and 7.10 Mev and a half life of 7.3 seconds. Gamma radiation resulting from activation of other elements normally found in subterranean formations is avoided by energy level discrimination or time discrimination. In addition to the oxygen-16 log, Caldwell et al. disclose the use of a neutron log to identify porous, fluid filled zones.

A similar oxygen logging technique based upon the detection of gamma rays produced by reaction (1) is disclosed in U.S. Pat. No. 3,465,151 to Youmans. Youmans discloses that the process may be carried out with either a continuous or pulsed neutron source. In addition, the patentee discloses that the oxygen activation logging technique may be carried out in conjunction with natural gamma ray logging or neutron logging.

In a somewhat different exploration field, U.S. Pat. No. 3,686,503 to Givens et al. discloses a radioactive well logging technique in which delayed neutrons resulting from the neutron fission of uranium are detected in order to arrive at a quantitative indication of the uranium content of a subterranean formation. As disclosed in that patent, possible uranium bearing formations may be identified by a preliminarily run natural gamma ray log. A subsurface assaying operation is then carried out by locating in a borehole adjacent a suspected uranium containing formation a logging tool which includes a source of fast neutrons and a thermal neutron detector. The formation is irradiated with repetitive bursts of fast neutrons from the source and subsequent to each source and after dissipation of the original source neutrons, the detector is operated to detect delayed neutrons resulting from neutron fission of uranium. As disclosed in the aforementioned patent to Givens et al., and also in U.S. Pat. Nos. 3,686,503 to Givens et al. and 3,688,117 to Givens, the gamma rays emitted in accordance with reaction (1) may be employed to advantage in a technique whereby the intensity of the neutron output from the source is indirectly monitored.

In the uranium exploration technique described in U.S. Pat. No. 3,686,503, oxygen-17 responds to irradiation with fast neutrons of an energy above 7.93 Mev to produce delayed neutrons in accordance with the reaction:

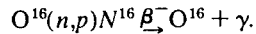

$$O^{17}(n,p)N^{17} \xrightarrow{\beta^-} O^{17} \rightarrow O^{16} + n. \tag{2}$$

The neutrons from equation (2) are produced during the same time periods as certain of the delayed fission neutrons from uranium and thus contribute to the count observed during the uranium assaying operation. In order to correct for this, a zone containing no uranium is subjected to the above-described assay technique in order that corrections may be made in the uranium assay results.

SUMMARY OF THE INVENTION

In accordance with the present invention, there is provided a new and improved petroleum exploration process in which subterranean formations penetrated by a borehole are characterized as hydrocarbon saturated or water saturated on the basis of their oxygen content. In carrying out the invention, a porosity log of the borehole under investigation is obtained. From this log one or more formations are identified which are indicated as having a sufficiently high porosity to contain recoverable hydrocarbons. Thereafter, a delayed neutron log is obtained by irradiating the formation of interest with repetitive bursts of fast neutrons and during time intervals between the fast neutron bursts and after dissipation of the original source neutrons, a detector is operated in order to detect delayed neutrons resulting from the neutron irradiation of oxygen-17. The radiation thus detected is recorded in order to obtain a log representative of the oxygen content of the formation. Preferably the delayed neutron log is carried out in a plurality of formations penetrated by the well, including one or more formations which are indicated by the porosity log to be of a relatively low porosity. This will enable corrections to be made for any anomalies that are introduced into the oxygen log as a result of "mud damage" to the formations under investigation.

DESCRIPTION OF SPECIFIC EMBODIMENTS

The first step in carrying out the present invention is obtaining a porosity log of the well under investigation in order to identify relatively porous, fluid containing zones. Any of the conventionally known porosity logs may be employed. Typical of such logging procedures are neutron logging, self potential logging, gamma ray scattering logging (otherwise identified as density logging), and acoustic velocity logging. Such logging techniques are well known to those skilled in the art and will be described here only briefly with reference to the responses of such logs to formations of different lithologic properties. For a more detailed description of the various conventional porosity logging techniques, reference is made to Uren, L. C. PETROLEUM PRODUCTION ENGINEERING, OIL FIELD DEVELOPMENT, Fourth Edition, McGraw-Hill Book Company, Inc., New York (1956), pp. 566–577 (self potential logging); Faul, Henry, and Tittle, C. W., GEOPHYSICS, Vol. 16, No. 2, April, 1951, pp. 260–276, "Logging of Drill Holes by the Neutron, Gamma Method, and Gamma Ray Scattering" (neutron logging and gamma ray scattering); and U.S. Reissue Pat. No. 24,446 to Summers (acoustic velocity logging).

Figure 1:
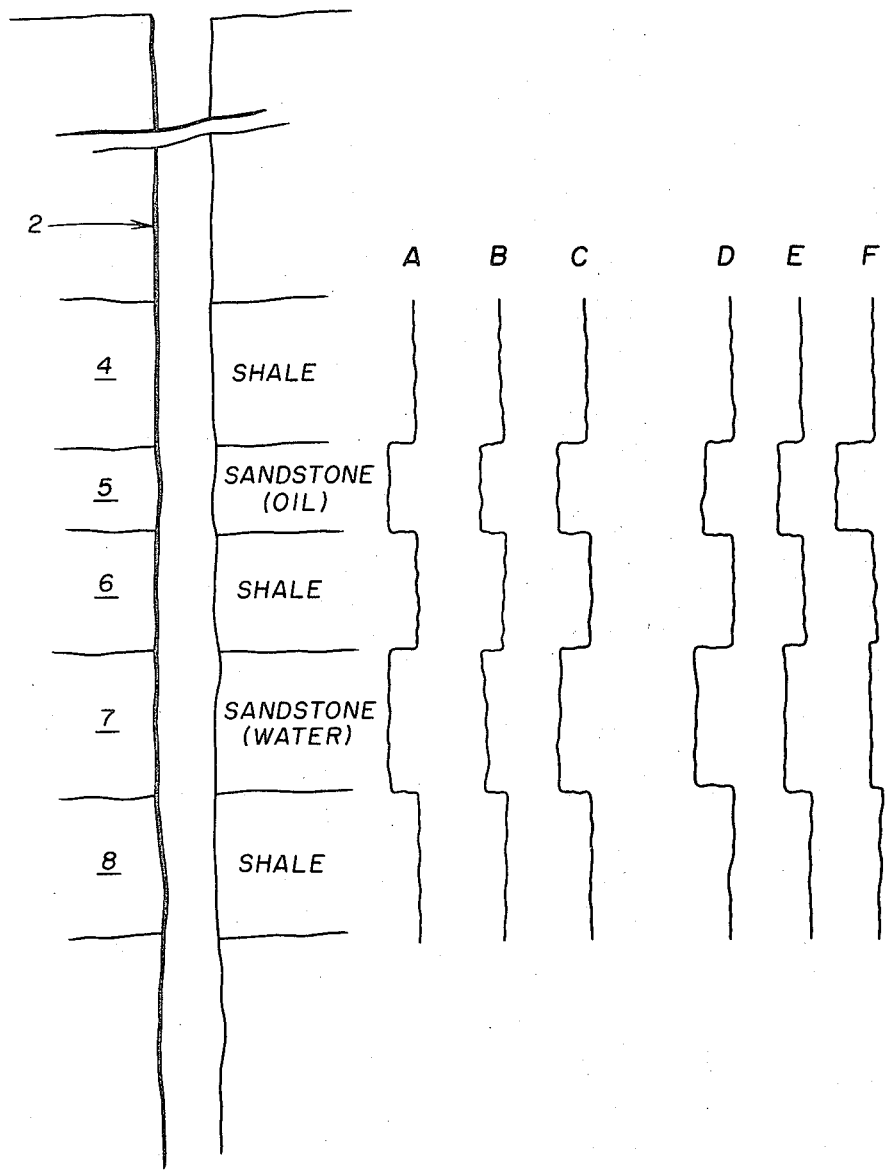
FIG. 1 is an illustration of a geologic section penetrated by a well and corresponding well logs.

Turning now to FIG. 1, there is illustrated a geologic section and various porosity logs corresponding to the section as well as the results of an oxygen log carried out as described hereinafter. More particularly and as illustrated in FIG. 1, there is shown a well 2 penetrating a plurality of subterranean formations 4, 5, 6, 7, and 8. Formations 4, 6, and 8 are depicted as being relatively nonporous shale zones, formations 5 and 7 are porous sandstones with formation 5 containing oil and formation 7 containing water. Porosity logs A, B, C, and D are shown in FIG. 1 with trace A representing a self potential log, trace B a neutron log (either neutron-gamma or neuron-neutron), trace C a gamma-ray scattering density log, and trace D an acoustic travel time log. In each case, the instrument response which is recorded to make the log is shown as deflecting to the left when passing from a shale to a porous sandstone. This deflection is of approximately the same magnitude regardless of whether the porous formation contains water or oil.

Also illustrated by trace E is a natural gamma ray log of the several formations shown in FIG. 1. While not a direct indicator of porosity, the natural gamma ray log enables the identification of shale zones through their natural radioactivity which is relatively high in comparison with that of most sedimentary rocks.

Trace F is a representation of an oxygen-17 neutron log obtained in accordance with the present invention. As shown, log F exhibits a pronounced deflection to the left when passing from a nonporous shale to a porous hydrocarbon bearing formation because of the lower oxygen content of the hydrocarbon zone. When passing from a shale to a porous water bearing zone, the deflection to the left, if observed at all, will be significantly less.

The well 2 in which the logging operations are carried out may be cased or uncased. In an uncased well, any (or all) of the above-identified logs may be run. If the well is cased, only the radioactive logging procedures may be employed.

After identifying relatively porous zones such as formations 5 and 7 of FIG. 1, an oxygen log is run in these zones in order to differentiate between hydrocarbon saturation and water saturation. In the present invention, the oxygen logging procedure is carried out by the detection of delayed neutrons resulting from the neutron irradiation of oxygen-17 in accordance with reaction (2) above. While this utilization of products from the oxygen-17 reaction may appear unusual in view of its low isotopic abundance (0.037%), the detection of delayed neutrons offers a number of advantages over the detection of gamma rays resulting from reaction (1). The neutron detection technique offers a deeper depth of investigation since the mean penetration length for neutrons is significantly longer than for gamma rays. For example, assuming that the oxygen log is run in a cased well with the detection of thermalized nuetrons, the mean penetration length of neutrons resulting from reaction (2) is about 25 percent greater than 6.13 Mev gamma rays resulting from reaction (1). In addition, the detection of delayed neutrons from oxygen-17 does not require energy level discrimination of the nature proposed, for example, in the aforementioned patent to Youmans.

The oxygen-17 neutron log is subject to interference in the event that a formation under investigation contains fissionable materials such as uranium or thorium. However, in most cases, a neutron count resulting from such fissionable elements can be readily identified since even a small concentration thereof will give a much higher neutron count change than will result from going from an oil saturated formation to a water saturated formation. Furthermore, if desired, a natural gamma ray log may be run and correlated with the oxygen log in order to avoid confusing a uranium or thorium oil containing formation with a water saturated formation. In this respect, the fissionable material containing formation will give both a high delayed neutron count and a high natural gamma ray count whereas the water saturated formation, while giving a high delayed neutron count, will give a low natural gamma ray count.

The oxygen-17 logging procedure of the present invention may be carried out with a pulsed neutron logging system similar to that disclosed in the aforementioned U.S. Pat. No. 3,686,503, but with modifications to accommodate its use in accordance with the present invention. Such a system is disclosed in FIG. 2. It is to be recognized that the logging system per se of FIG. 2 forms no part of the present invention and that any suitable system may be employed in the oxygen-17 logging operation.

Figure 2:
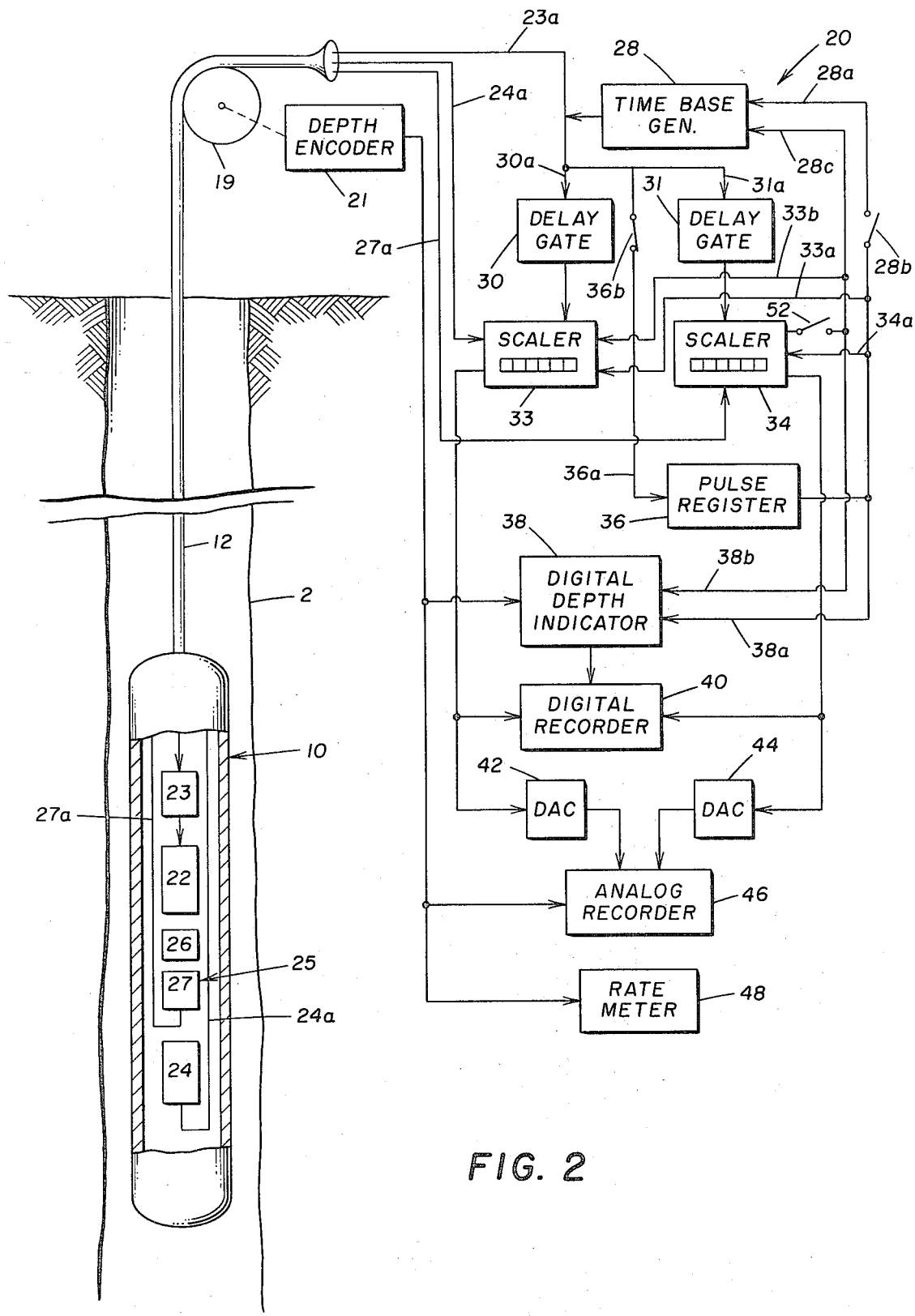
FIG. 2 is an illustration of a pulsed neutron logging system which may be employed in obtaining the oxygen-17 neutron log of the present invention.

Turning now to FIG. 2 there is illustrated a logging tool 10 which is suspended from a cable 12 within well 2. Signals from the logging tool 10 are transmitted uphole via conductors in cable 12 to an uphole analysis and recording circuit 20 at the surface. Circuit 20 operates on the downhole measurements and records them as explained hereinafter. The cable 12 is wound on a motor-driven drum 19 and the several conductors in cable 12 are connected via slip ring and brush connections (not shown) to circuit 20. A depth indicating means 21 produces a depth signal which is recorded in order that the downhole measurements may be correlated with the depth at which they are taken. Depth indicator 21 may take the form of an optical depth encoder of the type available from Dynamic Research Corp., as Model No. DRC-29-11-BO3-300.

The logging tool 10 comprises a pulsed neutron source 22 for irradiation of rock adjacent the borehole with bursts of fast neutrons, a control unit 23 for the source, and a radiation detector 24 for the detection of neutrons resulting from the reaction:

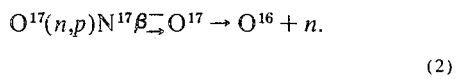

$$O^{17}(n,p)N^{17}\beta^-_\to O^{17} \to O^{16} + n. \tag{2}$$

The source 22 may be an accelerator-type deuterium-tritium source of fast neutrons. Radiation detector 24 preferably is a thermal neutron detector. For example, detector 24 may comprise one or more helium-3 proportional counters of the type described in U.S. Pat. No. 3,102,198 to Bonner. Such helium-3 counters are responsive primarily to thermal neutrons and become progressively nonresponsive to neutrons of progressively higher energy levels. The source 22 is operated cyclically to produce time-spaced bursts of fast neutrons, with the time intervals between the fast neutron bursts being greater than the time required for dissipation of the source neutrons within the formation. During the time intervals between the bursts and after dissipation of the source neutrons, the detector 24 is operated in conjunction with suitable gating circuitry as described hereinafter to detect thermalized neutrons resulting from reaction (2). The output from detector 24 is transmitted to the surface circuit by means of a conductor 24a which extends through cable 12. The gating circuitry may be employed to render detector 24 operative or responsive to the secondary radiation only during the desired measuring intervals. Usually, however, the detector 24 will be continuously responsive to the secondary radiation and the gating circuitry will be employed to gate the detector output to the appropriate measuring means during the desired measurement intervals.

The logging tool 10 also comprises a monitor 25 for obtaining an indirect measure of the neutron output from source 22. Monitor 25, which is of the type disclosed in U.S. Pat. No. 3,688,117, comprises a target 26 which emits secondary radiation in response to irradiation by neutrons from source 22 and a detector 27 for detecting such secondary radiation. The quantity of secondary radiation emitted from target 26 is proportional to the number of neutrons produced by source 22. Thus the output from detector 27 provides a measure of the intensity of neutron output from source 22.

Circuit 20 comprises a time base generator 28, delay gate generators 30 and 31, gated scalers 33 and 34, and a preset pulse register 36. Time base generator 28 is employed to generate a train of triggering pulses for operation of control unit 23 for the downhole neutron source 22 and the delay gate generators 30 and 31. Control unit 23 responds to a pulse from the time base generator to cause source 22 to emit a burst of fast neutrons. The delay gate generators respond to a pulse from time base generator 28 to enable scalers 33 and 34 to count and record the outputs from detectors 24 and 27, respectively, during the desired time intervals after the fast neutron burst. The uphole circuitry also includes a digital depth indicator 38 which receives the output from depth encoder 21 and applies it in digital format to a digital recorder 40. Indicator 38 may be a reversing accumulator available from Systems Development Incorporated, Dallas, Tex., as Model No. SDI 5243, and recorder 40 may take the form of a digital column printer available from Esterline-Angus, Inc., as Model No. P-500. The outputs from scalers 33 and 34 are applied to recorder 40 and also to digital-to-analog converters 42 and 44 where they are converted to analog format and applied to an analog recorder 46 along with the depth signal from indicator 21. The output from indicator 21 also is applied to a ratemeter 48 which indicates the speed at which the logging tool is moved through the borehole.

The oxygen-17 log may be obtained by a continuous procedure in which the tool 10 is moved continuously through the well during the logging operation or by an incremental procedure in which the logging tool is operated while held stationary at the desired locations in the well during the logging procedure. In carrying out a continuous logging operation, the logging tool 10 (FIG. 2) is lowered to a desired location in the well, normally at the bottom of the section to be logged. The section of the well under investigation is traversed with the logging tool while operating the source 22 at the desired rate to irradiate the adjacent rock material at a plurality of locations along the borehole with bursts of fast neutrons. The pulse repetition rate of source 22 is controlled by the pulse output signal from time base generator 28 which is applied via conductor 23a to the control unit 23. For example, the source may be operated so that it is pulsed to give 10 fast neutron bursts per second with each burst having a duration of about 10 microseconds. The output signal from the time base generator also is applied via conductors 30a and 31a to delay gate generators 30 and 31, respectively. Delay gate generator 30 operates in response to each pulse from generator 28 to enable scaler 33 to begin counting at some desired time interval after the fast neutron burst from source 22. For example, the scaler 33 may begin counting at about 2 to 5 milliseconds after each neutron burst and to continue counting until the start of the next neutron burst. The output from the detector 24 is applied through suitable amplification and pulse height discrimination stages (not shown) to the gated scaler 33. The output from detector 27 is likewise transmitted to the surface and applied through suitable amplification and pulse height discrimination stages (not shown) to gated scaler 34. Thus scaler 34 records a radiation count which is proportional to the number of neutrons produced by the downhole source 22. Scaler 34 normally will be enabled for counting by delay gate generator 31 for the same period between neutron bursts as scaler 33.

The output from time base generator 28 also is applied via channel 36a, including closed switch 36b, to preset pulse register 36. This register is set to generate a control pulse after receiving a preset number of timing pulses from generator 28. When the logging tool is operated to traverse the wellbore continuously, rather than incrementally, the number set into register 36 is determined by the pulse rate from generator 28, the speed at which the logging tool is moved through the borehole, and the number of fast neutron bursts desired per unit length of the well.

When the pulses accumulated from time base generator 28 reach the number set into pulse register 36, the register generates a signal pulse which is applied via channels 33a, 34a, and 38a to scalers 33 and 34 and to digital depth indicator 38, respectively. In response to this signal, the depth of the logging tool 10, as registered by depth indicator 38, and the data accumulated in scalers 33 and 34 are applied to digital recorder 40. For example, where the recorder 40 is a column printer as described previously, the data from units 33, 34, and 38 will be printed on paper tape. Upon completion of the recording of data, pulse register 36 and scalers 33 and 34 are reset to zero. The printing and resetting operations take only a few milliseconds and thus are completed during the delay period as determined by delay gate generators 30 and 31. Switch 28b in channel 28a is in the open position during the continuous logging operation. Thus generator 28 is unaffected by the output of register 36 and the operation of source 22 and scalers 33 and 34 continues.

The data accumulated in scalers 33 and 34 also are applied to digital-to-analog converters 42 and 44, respectively. The outputs from units 42 and 44 are analog voltage signals representative of the applied digital data. These voltage signals are applied to analog recorder 46 where they are recorded in analog format as a function of depth.

In obtaining the oxygen-17 neutron log by an incremental logging procedure, the tool 10 is located at the desired depth in the well and maintained stationary while the delayed neutron count resulting from the irradiation of oxygen-17 is obtained. Thereafter, the logging tool is moved to the next desired location in the well and a delayed neutron count for that location is obtained.

The duration of the fixed point log may be determined by the number of neutrons from source 22, as indicated indirectly by scaler 34, or by the number of neutron bursts from source 22 as indicated by pulse register 36. In the former mode of operation, switch 52 leading to channels 28c, 33b, and 38b is closed and switch 36b is opened. The scaler 34 records the radiation count from detector 27 (indicative of the number of neutrons from source 22) to a predetermined value and then applies a control signal by way of channels 28b, 33b, and 38b to the time base generator 28, scaler 33, and digital depth indicator 38. In response to this signal, the time base generator is turned off, thus terminating the downhole neutron output from source 22 and counting by both of scalers 33 and 34 to complete the fixed point log at that depth. In addition, the data in scalers 33 and 34 and the depth indicator 38 are recorded by recorder 40.

In the alternative mode of operation, the preset pulse register 36 is employed to determine the duration of the fixed point log. In this case, switch 52 is opened and switches 36b and 28b are closed. The number of pulses corresponding to the desired number of neutron bursts for the log is set into register 36. When the number of pulses from time base generator 28 reaches this number, pulse register 36 generates a signal which is applied by way of channel 28a to turn off the time base generator 28. This again terminates the downhole neutron pulsing operation as well as counting by both of scalers 33 and 34. The output signal from pulse register 36 also is applied to the scalers and to the digital depth indicator 38 to cause the data accumulated by the scalers and the depth to be recorded by recorder 40.

For reasons expressed in the aforementioned patent to Youmans, the best results from the oxygen-17 log will be obtained for wells in which the logged section of the well is filled with oil or is empty. The presence of an aqueous liquid such as a water base drilling mud will contribute heavily to the oxygen-17 neutron count, thus tending to mask the count due to oxygen-17 in the formations logged. However, even in this case the contribution to the neutron count from oxygen in the well liquid will be substantially constant so that the oxygen-17 neutron log should give some qualitative indication when going from a hydrocarbon zone to a water zone. Particularly where the well contains an aqueous liquid it will be preferred to obtain the oxygen-17 neutron log by means of a series of fixed point logging operations.

An additional masking effect may arise because of mud damage to the wall of the well. During the course of drilling a well, filtrate from the drilling mud will penetrate into the formations being drilled. The quantity and depth of penetration of this filtrate is dependent to some extent upon the permeabilities of the formation involved, but even relatively impermeable zones are subject to filtrate invasion. For example, shale zones often contain swellable clays which readily absorb water. When these zones are contacted with an aqueous base drilling mud, substantial invasion of filtrate from the mud may occur.

Since this fluid invasion during the drilling process is largely irreversible, the fluid contents of the formations near the well are permanently changed, thus affecting the results of the oxygen-17 neutron log. For example, a water zone exhibiting mud damage due to an oil base drilling mud will exhibit a lower oxygen-17 neutron count than a similar undamaged water zone. Conversely, a water damaged oil bearing zone will exhibit a higher oxygen-17 neutron count. In order to provide some compensation for the effect of mud damage, it is preferred in accordance with the invention that the oxygen-17 neutron log be carried out in a plurality of formations including at least some formations which are identifiable as relatively nonporous shale zones. By this technique the oxygen-17 log will provide at least a qualitative indication when going from a hydrocarbon zone to a water zone or vice versa.

I claim:

1. In a method of exploring for petroleum hydrocarbons whereby hydrocarbon saturation and water saturation of subterranean formations penetrated by a borehole are distinguished on the basis of oxygen content, the steps comprising:
   a. obtaining a porosity log of said borehole and from said porosity log identifying at least one formation indicated as having a sufficiently high porosity to contain recoverable hydrocarbons,
   b. irradiating said formation with repetitive bursts of fast neutrons, the time intervals between said bursts being greater than the time required for dissipation of neutrons originating in said bursts,
   c. during time intervals between said bursts and after dissipation of neutrons originating in said bursts operating a detector to detect delayed neutrons resulting from the irradiation of oxygen-17 with neutrons, and d. recording the radiation detected in step (c) to obtain a log representative of the oxygen content of said formation.

2. The method of claim 1 wherein the radiation detected in step (c) comprises thermal neutrons.

3. The method of claim 1 wherein said porosity log is obtained by running a neutron log in said borehole.

4. The method of claim 1 wherein said porosity log is obtained by running a self potential log in said borehole.

5. The method of claim 1 wherein said porosity log is obtained by running a gamma ray scattering density log in said borehole.

6. The method of claim 1 wherein said porosity log is obtained by running an acoustic velocity log in said borehole.

7. The method of claim 1 wherein steps (b), (c), and (d) are carried out in a plurality of formations penetrated by said borehole.

8. The method of claim 7 wherein at least one of said plurality of formations is a formation identified by the log of step (a) as being a relatively nonporous zone.

* * * * *